US012680349B2

(12) United States Patent
Zejda

(10) Patent No.: US 12,680,349 B2
(45) Date of Patent: Jul. 14, 2026

(54) MOTOR VEHICLE LOCK DEVICE

(71) Applicant: KIEKERT AKTIENGESELLSCHAFT, Heiligenhaus (DE)

(72) Inventor: Jan Zejda, Chrudim (CZ)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 52 days.

(21) Appl. No.: 18/845,180

(22) PCT Filed: Feb. 17, 2023

(86) PCT No.: PCT/DE2023/100130
§ 371 (c)(1),
(2) Date: Sep. 9, 2024

(87) PCT Pub. No.: WO2023/186202
PCT Pub. Date: Oct. 5, 2023

(65) Prior Publication Data

US 2025/0179839 A1 Jun. 5, 2025

(30) Foreign Application Priority Data

Mar. 30, 2022 (DE) ..................... 10 2022 107 499.4

(51) Int. Cl.
*E05B 77/38* (2014.01)
*E05B 83/16* (2014.01)
*E05B 85/26* (2014.01)

(52) U.S. Cl.
CPC .............. *E05B 77/38* (2013.01); *E05B 85/26* (2013.01); *E05B 83/16* (2013.01)

(58) Field of Classification Search
CPC .......... E05B 77/38; E05B 77/36; E05B 77/42; E05B 83/16; E05B 83/18; E05B 85/26;
(Continued)

(56) References Cited

U.S. PATENT DOCUMENTS 4,073,519 A * 2/1978 Kurozu ................. E05B 85/243
292/216
4,130,308 A * 12/1978 Jeavons ................ E05B 85/045
292/216
(Continued)

FOREIGN PATENT DOCUMENTS

CN 108930458 A * 12/2018 ............. B60N 2/366
DE 2320351 A1 10/1974
(Continued)

OTHER PUBLICATIONS

KR20090097707 Espacenet machine translation claims and description (Year: 2025).*
(Continued)

*Primary Examiner* — Steven A Tullia
(74) *Attorney, Agent, or Firm* — Renner, Otto, Boisselle & Sklar, LLP

(57) ABSTRACT

A motor vehicle locking device and, in particular, a motor vehicle door lock and preferably a motor vehicle tailgate lock, which is equipped with a locking mechanism consisting substantially of a rotary latch and a pawl. Furthermore, a locking bolt interacting with the locking mechanism is realized. In addition, a damping element for the locking mechanism and/or the locking bolt. According to the invention, the damping element has at least three stop contours for the rotary latch, the pawl, and the locking bolt.

11 Claims, 2 Drawing Sheets

(58) Field of Classification Search

CPC ............. E05B 17/0041; E05B 17/0045; Y10S 292/56; Y10S 292/38; Y10T 292/688; Y10T 292/1047

USPC ..................................................... 70/101, 463

See application file for complete search history.

(56) References Cited

U.S. PATENT DOCUMENTS

| | | | | | |
|---|---|---|---|---|---|
| 4,358,141 | A | * | 11/1982 | Hamada | E05B 85/243 292/216 |
| 4,756,564 | A | * | 7/1988 | Ikeda | E05B 85/26 292/216 |
| 5,141,270 | A | * | 8/1992 | Shibata | E05B 77/38 292/216 |
| 6,024,389 | A | * | 2/2000 | Arabia, Jr. | E05B 77/38 292/DIG. 60 |
| 7,188,872 | B2 | * | 3/2007 | Kalargeros | E05B 85/26 292/216 |
| 7,195,292 | B2 | * | 3/2007 | Ketelsen | E05B 77/38 292/201 |
| 7,401,822 | B2 | * | 7/2008 | Graute | E05B 77/38 292/216 |
| 10,280,660 | B2 | | 5/2019 | Nozawa | |
| 10,450,782 | B2 | * | 10/2019 | Nurmi | E05B 85/26 |
| 11,162,284 | B2 | * | 11/2021 | Ottino | E05B 81/15 |
| 11,608,661 | B2 | * | 3/2023 | Bishop | E05B 77/38 |
| 11,965,364 | B2 | * | 4/2024 | Müller | E05B 77/38 |
| 2006/0087126 | A1 | * | 4/2006 | Roussel | E05B 85/26 292/116 |
| 2006/0097523 | A1 | * | 5/2006 | Cetnar | E05B 85/26 292/216 |
| 2008/0303292 | A1 | * | 12/2008 | Graute | E05B 77/38 292/216 |
| 2016/0177599 | A1 | * | 6/2016 | Nozawa | E05B 85/243 292/164 |

FOREIGN PATENT DOCUMENTS

| | | | | | |
|---|---|---|---|---|---|
| DE | 3927445 | C2 | * | 12/2000 | E05B 77/38 |
| DE | 10216313 | A1 | | 10/2003 | |
| DE | 102005023991 | A1 | * | 11/2006 | E05B 77/38 |
| DE | 102006025719 | A1 | | 12/2007 | |
| DE | 102008021872 | A1 | | 10/2009 | |
| DE | 102011003410 | A1 | * | 8/2012 | E05B 77/34 |
| DE | 202012001961 | U1 | | 5/2013 | |
| DE | 102020132191 | A1 | | 6/2021 | |
| EP | 1620617 | B1 | * | 12/2009 | E05B 77/36 |
| FR | 2782111 | A1 | * | 2/2000 | E05B 85/26 |
| GB | 2048365 | A | * | 12/1980 | E05B 77/38 |
| GB | 2369401 | A | * | 5/2002 | E05B 81/34 |
| JP | 2010031521 | A | * | 2/2010 | E05B 65/32 |
| JP | 5285541 | B2 | * | 9/2013 | E05B 85/02 |
| KR | 20090097707 | A | * | 9/2009 | E05B 77/36 |
| KR | 20090102046 | A | * | 9/2009 | E05B 77/42 |
| WO | 2006125414 | A2 | | 11/2006 | |
| WO | WO-2018149443 | A1 | * | 8/2018 | E05B 77/38 |
| WO | WO-2019072339 | A1 | * | 4/2019 | E05B 83/18 |
| WO | WO-2020099961 | A1 | * | 5/2020 | E05B 77/42 |

OTHER PUBLICATIONS

International Search Report mailed Jun. 1, 2023, for priority International Application No. PCT/DE2023/100130.

* cited by examiner

MOTOR VEHICLE LOCK DEVICE

This application is a national phase of International Patent Application No. PCT/DE2023/100130 filed Feb. 17, 2023, which claims priority to German Patent Application No. 10 2022 107 499.4 filed Mar. 30, 2022, each of which is hereby incorporated herein by reference in its entirety.

FIELD OF DISCLOSURE

The invention relates to a motor vehicle locking device, in particular, a motor vehicle lock and preferably a motor vehicle tailgate lock, with a locking mechanism consisting substantially of a rotary latch and a pawl, furthermore with a locking bolt interacting with the locking mechanism, and with a damping element for the locking mechanism and/or the locking bolt.

BACKGROUND OF DISCLOSURE

The motor vehicle locking device is usually arranged in or on a motor vehicle door and preferably a motor vehicle tailgate. In contrast, the locking bolt is situated on the body. When the motor vehicle door in question is closed, the locking bolt moves into an inlet opening of the locking mechanism or of a lock case or corresponding lock housing. In this way, the rotary latch is usually first moved into a pre-locking position and then into a main locking position, in which it is held in place by the pawl. In principle, the locking mechanism can also have more than one pawl in the sense of a multi-pawl locking mechanism.

The damping element provided at this point usually ensures that, for example, the rotary latch or the pawl is braked during this process. As a result, overall improvements in comfort and improved acoustics are observed. For example, this corresponds to the procedure from the generic prior art according to DE 10 2006 025 719 A1.

In addition, there are already approaches in the further prior art according to DE 20 2012 001 961 U1 for providing two stops on a common stop contour or a damping element. One stop is provided for the electric motor drive, while the other second stop interacts with a lock element—for example, a locking lever. In this way, synergy effects are already observed such that, in the exemplary case described, the electric motor drive on the one hand and the lock element in question on the other do not rely on different and separately designed damping elements, but, rather, a common stop contour is equipped with the two corresponding stops. The stop contour can be made of rubber or a rubber-elastic plastic.

The prior art has generally proven itself when, for example, it comes to combining two stops for elements to be dampened in connection with a motor vehicle locking device in the context of a common stop contour. However, additional simplifications and cost reductions are still being called for. This is where the invention steps in.

SUMMARY OF DISCLOSURE

The invention is based upon the technical problem of further developing such a motor vehicle locking device in such a way that the manufacturing and assembly costs are further reduced compared to previous procedures.

To solve this technical problem, a generic motor vehicle locking device in the context of the invention is characterized in that the damping element has at least three stop contours for the rotary latch, the pawl, and the locking bolt.

According to the invention, a (single) and common damping element is used, which is able to dampen the rotary latch, the pawl, and finally the locking bolt during their movement and interaction with each other.

The invention is based, first of all, upon the knowledge that a damping of the movement of the pawl is typically carried out or is advantageously to be carried out when the pawl falls into a main notch of the rotary latch. In this main locking position of the locking mechanism, the locking bolt is usually also in its end position in relation to an inlet opening for the locking bolt defined by the rotary latch, so that the corresponding damping position of the pawl usually also corresponds to the corresponding damping position of the locking bolt. In other words, most of the time (in the main locking position of the locking mechanism) both the pawl and the locking bolt are in their respective damping positions. As a result, both the pawl and the locking bolt rest upon the corresponding stop contours. In contrast, the stop contour provided for the rotary latch is free of the rotary latch.

In fact, the stop contour for the rotary latch usually only comes into play or takes effect when the rotary latch is in its fully or almost fully open position (and not in the previously described closed position or main notch). In this connection, the corresponding stop contour for the rotary latch ensures that the mostly spring-supported opening movement of the rotary latch is dampened.

In this way, an effective dampening of the essential elements of the motor vehicle locking device, viz., the rotary latch as well as the pawl and the locking bolt, is achieved. Typically, the pawl and the locking bolt are dampened together in the main locking position of the locking mechanism, viz., they rest against their corresponding stop contour of the damping element. In contrast, the stop contour for the rotary latch only takes effect when the rotary latch is completely or almost completely opened. This functional separation makes it possible to arrange the three stop contours for the rotary latch, the pawl, and the locking bolt on the one (single) damping element at different locations from one another.

For this purpose, the damping element is advantageously equipped with a rotary latch arm, a pawl arm, and a locking bolt arm. The three arms can be connected to each other in such a way that the pawl arm and the locking bolt arm extend from the central rotary latch arm on both sides.

By arranging the rotary latch arm centrally, the invention takes into account the fact that, in the main locking position of the locking mechanism, both the pawl and the locking bolt—as described—usually assume their respective damping position in contact with the corresponding stop contour of the damping element. In contrast, the damping position of the rotary latch is associated with its fully open position, in which the locking bolt is extended from the inlet mouth of the rotary latch, and the pawl is at a distance from the rotary latch or is lifted off it. In this way, a bolt on the outer circumference of the rotary latch can easily interact with the central rotary latch arm or the stop contour provided there.

The design is furthermore such that a rotary latch stop contour is arranged on the rotary latch arm, a pawl stop contour is arranged on the pawl arm, and finally a locking bolt stop contour is arranged on the locking bolt arm. The pawl stop contour and the locking bolt stop contour each have a central damping recess.

The central damping recess additionally takes on a damping function together with the elastically designed damping element. This is because, in the area of the damping recess, the material, surrounding the damping recess, of the damping element can move into the damping recess, so that an additional macroscopic damping of the movement of both the pawl and the locking bolt is provided by means of the damping recess. In contrast, the (elastomeric) material of the damping element mainly provides microscopic damping. In other words, the damping recess can give way inwards and thus absorb and dampen any relatively hard impacts from the pawl on the one hand and the locking bolt on the other on the relevant stop contour. All this happens without the damping element in the area of the corresponding stop contour being mechanically damaged in any way.

In contrast, the rotary latch stop contour is generally pot-like or arched to accommodate a bolt on the rotary latch. The invention is based upon the knowledge that the bolt in question on the outer circumference of the rotary latch only moves or engages the pot-shaped rotary latch stop contour in question when the rotary latch assumes its open or almost open position. Due to the pot-like character, the bolt of the rotary latch is effectively braked, and the opening movement of the rotary latch is stopped.

Specifically, it has proven to be effective if the pawl stop contour is designed to be prismatic, with a polygonal outer circumference for interaction with a corresponding polygonal recess of the pawl. Due to this corresponding polygonal design, the pawl is not only braked when it assumes the main locking position, but at the same time the pawl is fixed in its position in this main locking position of the locking mechanism. Because the mutual engagement of the polygonal outer circumference of the pawl stop contour in the corresponding polygonal recess on the pawl ensures that the pawl is centered, and that it is held in its position. This means that the pawl stop contour not only has a braking and dampening function for the pawl, but also ensures that it is centered and that it maintains the position it has assumed (main locking position).

The locking bolt stop contour is usually also prismatic, with a trapezoidal outer circumference for the predominantly cylindrical locking bolt that moves against it. The trapezoidal outer circumference of the locking bolt stop contour ensures particularly effective damping, especially since the central damping recess described above is also implemented at this point. Because, when the cylindrical locking bolt strikes the trapezoidal outer circumference of the locking bolt stop contour, the corresponding trapezoidal design is spread, as it were, and can also be spread because the material displaced in this process can simultaneously escape into the damping recess. In any case, this method allows a particularly effective damping of the movement of the locking bolt, both in geometric and acoustic terms.

Finally, the design is such that the locking bolt stop contour and the pawl stop contour form an obtuse angle between them. In addition, the locking bolt stop contour and the pawl stop contour are usually each connected at the end to the central rotary latch arm with the rotary latch stop contour. The invention is based upon the knowledge that, in particular in the main locking position of the locking mechanism, the pawl on the one hand and the locking bolt on the other assume positions spaced apart from one another, and, in contrast, the bolt is arranged centrally on the outer circumference of the rotary latch in the open position of the rotary latch, as will be explained in more detail below with reference to the exemplary embodiment.

Ultimately, it has proven to be particularly advantageous that the damping element with the three arms and the three stop contours is made as a single piece from a thermoplastic material. Flexible or elastomeric plastics have proven to be particularly suitable—for example, PUR (polyurethane) plastics and especially PUR elastomers. However, other elastomeric plastics such as SBR (styrene-butadiene rubber), NBR (nitrile rubber), EPDM (ethylene propylene diene rubber), etc., can be used just as well. The plastics mentioned can generally be processed by injection molding, so that the damping element with the individual arms and contours can be manufactured in one go, in one piece and cost-effectively. The one-piece design also facilitates installation in a housing of the motor vehicle locking device, so that, overall, the previously asserted special advantages with regard to manufacture and assembly and thus the observed reduced costs are achieved. These are the main advantages.

In the following, the invention is explained in more detail with the aid of a drawing showing only an exemplary embodiment; in the figures:

DETAILED DESCRIPTION

Figure 1:
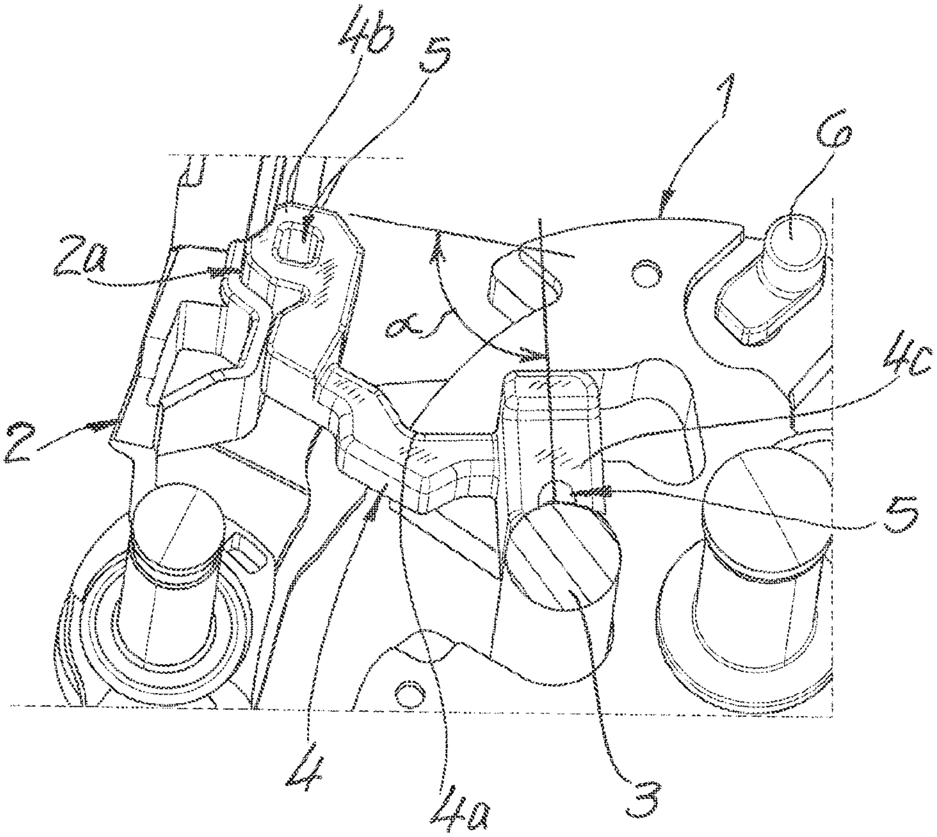
FIGS. 1 and 2 show the motor vehicle locking device according to the invention in a detail cutout in different functional positions.

The figures show a motor vehicle locking device which, in the exemplary embodiment, is a motor vehicle door lock and, in particular, a motor vehicle tailgate lock. The motor vehicle lock shown has a locking mechanism 1, 2 made up substantially of a rotary latch 1 and a pawl 2. In addition, a locking bolt 3 interacting with the locking mechanism 1, 2 can be seen, which may, for example, be arranged on the body side, whereas the locking mechanism 1, 2 is arranged on the door or flap side.

Of particular importance is a damping element 4 for the locking mechanism 1, 2 and the locking bolt 3, respectively. It can be seen that the damping element 4 has a total of three stop contours **4*a*, 4*b*, 4*c* for the rotary latch 1, the pawl 2, and the locking bolt 3. In fact, at this point, a rotary latch stop contour 4*a* is provided on a corresponding rotary latch arm, a pawl stop contour 4*b* on the corresponding pawl arm, and finally a locking bolt stop contour 4*c* on the corresponding locking bolt arm. According to the exemplary embodiment, the respective stop contours 4*a*, 4*b*, and 4*c* can be identified by the corresponding three arms of the damping element 4. It can also be seen that the three arms are connected to one another in such a way that the pawl arm with the pawl stop contour 4*b* and the locking bolt arm with the locking bolt stop contour 4*c* extend from the central rotary latch arm with the rotary latch stop contour 4*a*** on both sides.

In FIG. 1, the motor vehicle locking device is shown and reproduced in a main locking position of the locking mechanism 1, 2. It can be seen that, in this main locking position, both the pawl 2 and the locking bolt 3 each assume their damping position in contact with the corresponding stop contour **4*b*, 4*c*. Furthermore, this illustration makes it clear that both the pawl stop contour 4*b* and the locking bolt stop contour 4*c* each have a central damping recess 5. Due to this central damping recess 5, the corresponding contour or stop contour 4*b*, 4*c* can also accommodate relatively large travel distances when the pawl 2 on the one hand and the locking bolt 3 on the other come into contact with the respective contour 4*b*, 4*c*, because the damping recess 5** in question is slightly deformed inwards and allows such a deformation. This means that even large travel distances can be accommodated and controlled in conjunction with damping.

It can be seen that the rotary latch stop contour **4*a* is designed as a whole in a pot-like manner for a bolt 6 on the rotary latch 1 to engage therein. For this purpose, the bolt 6 is arranged on the outer circumference of the rotary latch 1. In the closed position or main locking position of the locking mechanism 1, 2 shown in FIG. 1, the bolt 6 in question and thus also the rotary latch 1 are arranged to be spaced apart from the pot-like rotary latch stop contour 4***a*. In fact, the rotary latch stop contour 4*a* only comes into effect when the rotary latch 1 moves into its fully open or almost fully open position, as shown in FIG. 2.

It can be seen that the pawl stop contour 4*b* is prismatic and has a polygonal outer circumference. This polygonal outer circumference can interact with a corresponding polygonal recess 2*a* of the pawl 2. Namely, this applies if and when the pawl 2 and the locking mechanism 1, 2 as a whole assume the main locking position shown in FIG. 1. This is because, in this main locking position, the design is not only such that the pawl 2 moves in a damping manner against the pawl stop contour 4*b* in question, wherein the damping recess 5 may also be deformed. Rather, in the main locking position assumed by the pawl 2, the interaction between the polygonal outer circumference of the pawl stop contour 4*b* with the corresponding polygonal recess 2*a* of the pawl 2 ensures that the pawl 2 is simultaneously centered to a certain extent in this position.

The locking bolt stop contour 4*c* is also prismatic, with a trapezoidal outer circumference for the predominantly cylindrical locking bolt 3 moving against it. Due to the trapezoidal character of the locking bolt stop contour 4*c* including the damping recess 5, any movements of the locking bolt 3 into the main locking position and when it hits the locking bolt stop contour 4*c* are initially absorbed by possible deformations of the damping recess 5. These deformations are additionally permitted by the fact that the trapezoidal outer circumference of the locking bolt stop contour 4*c* is spread out at this point, and consequently allows a deformation of the damping recess 5.

Figure 2:
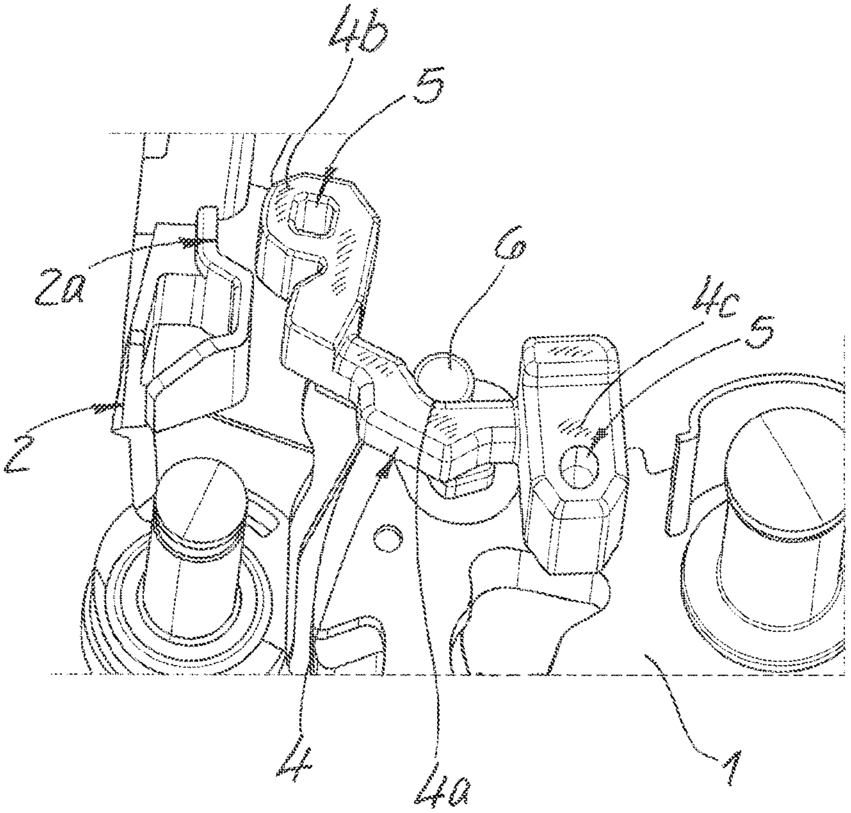

A comparison of FIGS. 1 and 2, makes clear that the locking bolt stop contour 4*b* and the pawl stop contour 4*c* form an obtuse angle α between them. In addition, both the locking bolt stop contour 4*c* and the pawl stop contour 4*b* are each connected at the end to the central rotary latch arm with the rotary latch stop contour 4*a*. In summary, the damping element with the three arms and the three stop contours 4*a*, 4*b*, and 4*c* is made in one piece from a thermoplastic material. Here, for example, elastomeric plastics such as PUR elastomers have proven to be particularly favorable.

As already explained, the motor vehicle locking device or the corresponding locking mechanism 1, 2 is in its main locking position in the illustration according to FIG. 1. In this main locking position, the pawl 2 has fallen into a main locking position of the rotary latch 1. In addition, the locking bolt 3 assumes its end position in an inlet opening of the rotary latch 1. This means that both the pawl 2 and the locking bolt 3 are each in their damping position in contact with the corresponding pawl stop contour 4*b* on the one hand and the locking bolt stop contour 4*c* on the other. In contrast, the rotary latch stop contour 4*a* is not used.

As soon as the locking mechanism 1, 2 is opened and consequently the rotary latch 1 has been pivoted counterclockwise about its axis starting from the closed position or main locking position according to FIG. 1 according to the exemplary embodiment (with the pawl 2 lifted off), the bolt 6 can move in the direction of the rotary latch stop contour 4*a*, as can be understood from FIG. 2. Since the rotary latch stop contour 4*a* is pot-like according to the exemplary embodiment, the rotary latch 1 or the bolt 6 located on its outer circumference is received in the pot-like rotary latch stop contour 4*a* during this process, or is braked when retracted therein. In fact, during this process, the pot-like rotary latch stop contour 4*a* is “bent” to a certain extent, which is easily possible due to the design made of an elastomer with the other stop contours 4*b* and 4*c* provided on one side.

As a result, a motor vehicle locking device is provided which is equipped with a single damping element 4 made of an elastomeric thermoplastic material. The damping element 4 assumes a damping function for both the pawl 2 and the locking bolt 3, particularly in the main locking position of the locking mechanism 1, 2. In addition, the damping element 4 ensures that the rotary latch 1 is also dampened in its movement in its fully open or almost fully open position. The motion damping provided by the damping element 4 ensures that hard impacts are avoided at this point, and, in particular, the acoustics are improved. These are the main advantages.

LIST OF REFERENCE SIGNS

1 Rotary latch
2 Catch
2 Polygonal recess
1, 2 Locking mechanism
3 Locking bolt
4 Damping element
4*a*, 4*b*, 4*c* Stop contours
4*a* Rotary latch stop contour
4*b* Pawl stop contour
4*c* Locking bolt stop contour
5 Central damping recess
6 Bolt
α Obtuse angle

The invention claimed is:

1. A motor vehicle locking device comprising:
- a locking mechanism including a rotary latch and a pawl,
- a locking bolt interacting with the locking mechanism, and
- a damping element for the locking mechanism and the locking bolt,
- wherein the damping element has at least three stop contours including a rotary latch stop contour for the rotary latch, a pawl stop contour for the pawl, and a locking bolt stop contour for the locking bolt,
- wherein the damping element has a rotary latch arm, a pawl arm, and a locking bolt arm,
- wherein the pawl arm extends from a first end of the rotary latch arm and the locking bolt arm extends from a second end of the rotary latch arm,
- wherein the second end of the rotary latch arm is opposite the first end of the rotary latch arm, and
- wherein the rotary latch stop contour is arranged in the rotary latch arm between the pawl arm and the locking bolt arm and the rotary latch stop contour is configured as an inward arched contour.

2. The motor vehicle locking device according to claim 1, wherein the pawl stop contour is arranged on the pawl arm, and the locking bolt stop contour is arranged on the locking bolt arm.

3. The motor vehicle locking device according to claim 1, wherein the pawl stop contour and the locking bolt stop contour each have a central damping recess.

4. The motor vehicle locking device according to claim 1, wherein the pawl stop contour is prismatic, with a polygonal outer circumference for interaction with a corresponding polygonal recess of the pawl.

5. The motor vehicle locking device according to claim 1, wherein the locking bolt stop contour is prismatic, with a trapezoidal outer circumference for engaging with the locking bolt moving against the locking bolt stop contour, the locking bolt being cylindrical.

6. The motor vehicle locking device according to claim 1, wherein the locking bolt stop contour and the pawl stop contour form an obtuse angle between them and are each connected on one side to the rotary latch arm with the rotary latch stop contour.

7. The motor vehicle locking device according to claim 1, wherein the damping element with the arms and the stop contours is made in one piece from a thermoplastic material.

8. The motor vehicle locking device according to claim 7, wherein the thermoplastic material is an elastomeric plastic material.

9. The motor vehicle locking device according to claim 7, wherein the thermoplastic material is polyurethane.

10. The motor vehicle locking device according to claim 1, wherein the pawl stop contour dampens the pawl and the locking bolt stop contour dampens the locking bolt when the locking mechanism is in a main locking position, and the rotary latch stop contour dampens the rotary latch when the locking mechanism is in an open position.

11. The motor vehicle locking device according to claim 10, wherein the rotary latch is spaced apart from the rotary latch stop contour when the locking mechanism is in the main locking position.

* * * * *